March 30, 1954  T. L. FAWICK  2,673,573
FLUID DISTENSIBLE ACTUATING MEANS FOR CLUTCHES AND BRAKES
Filed Nov. 27, 1951

INVENTOR.
THOMAS L. FAWICK
BY
ATTORNEY

Patented Mar. 30, 1954

2,673,573

UNITED STATES PATENT OFFICE 2,673,573

FLUID DISTENSIBLE ACTUATING MEANS FOR CLUTCHES AND BRAKES

Thomas L. Fawick, Cleveland, Ohio, assignor, by mesne assignments, to Federal Fawick Corporation, a corporation of Michigan Application November 27, 1951, Serial No. 258,488

4 Claims. (Cl. 137—784)

This invention relates to the construction of fluid-distensible annular bag assemblies for use in clutches and in brakes for effecting and discontinuing the frictional engagements of two relatively rotatable structures.

Its chief objects are to provide, in such an assembly, some or all of the advantages of economy of construction, facility of assembly and disassembly, compactness of structure, lightness, and durability.

Figure 1:
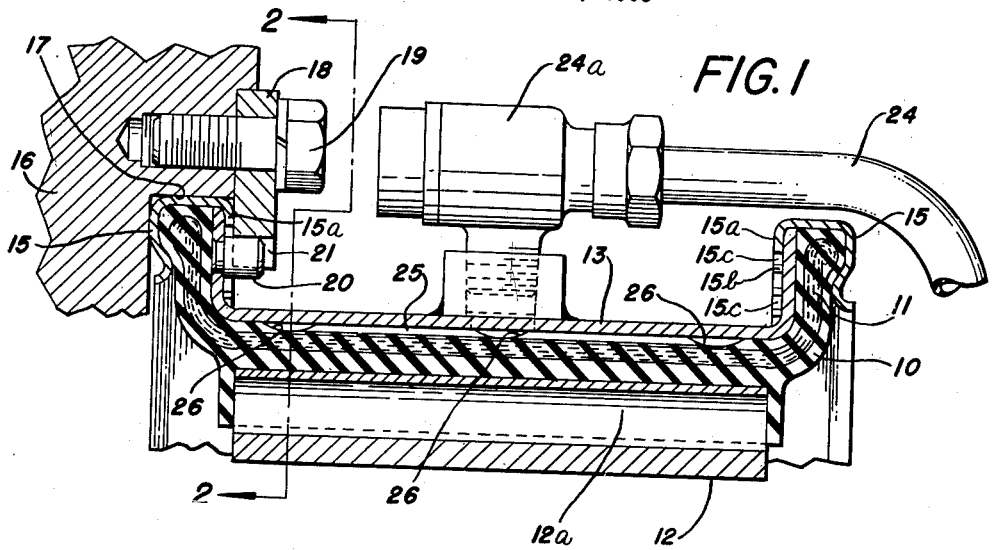
Fig. 1 is an axially-extending cross-section of a bag assembly embodying my invention in its preferred form.

The annular rubber bag, here shown as being of the inwardly-distending, constricting type, is shown at 10 as having a cord reinforcement 11, and as having mounted upon it a set of wear shoes 12, 12, held to the bag by anchoring ribs 12ᵃ, 12ᵃ formed on the bases of the respective shoes and snapped into respective complemental grooves or recesses molded in the external face of the inner-periphery of the bag.

The bag is of outwardly open U shape in cross-section and is of a size to fit snugly about and against the external face of an outwardly open U shaped metal base member 13, preferably of rolled sheet-metal.

The side walls of the bag are formed with anchoring beads extending along their annular margins. For clamping and sealing these bead portions of the bag to the margins of the legs of the U shaped metal base member 13, respective clamping rings 15, 15 of inwardly open channel form, preferably of rolled sheet-metal, are mounted upon the respective pairs of bag and base margins. If it is desired to use clamping rings 15 of endless form the axially inner margin 15ᵃ of each can be initially a continuation of the transversely flat outer peripheral portion of the ring, for sliding of the ring axially into place upon the members to be clamped, and this margin 15ᵃ can then be crimped or bent inwardly, to the clamping position in which it is shown. To facilitate this operation the flanges 15ᵃ, 15ᵃ can be formed with notches 15ᵇ, 15ᵇ extending inward from their free edges, to provide bendable fingers 15ᶜ, 15ᶜ as in the case of some types of hose clamps.

For securing the bag 10 in proper centered relation to a flywheel 16 or torque sustaining support, for example, the fly wheel is formed with an inwardly facing centering shoulder 17, within which the adjacent clamped-margin assembly fits and is held, with further compression of the clamped-margin assembly, by two semi-circular clamping plates 18, 18 secured to the fly-wheel 16 by bolts 19, 19.

To compel the bag assembly to rotate with the flywheel, a circumferentially spaced set of studs such as the stud 20 or interlock means project from the inner side face of the adjacent leg of the U-shaped base member 13, into respective notches such as the notch 21 formed in the radially inner margins of the clamping plates 18, 18.

Figure 2:
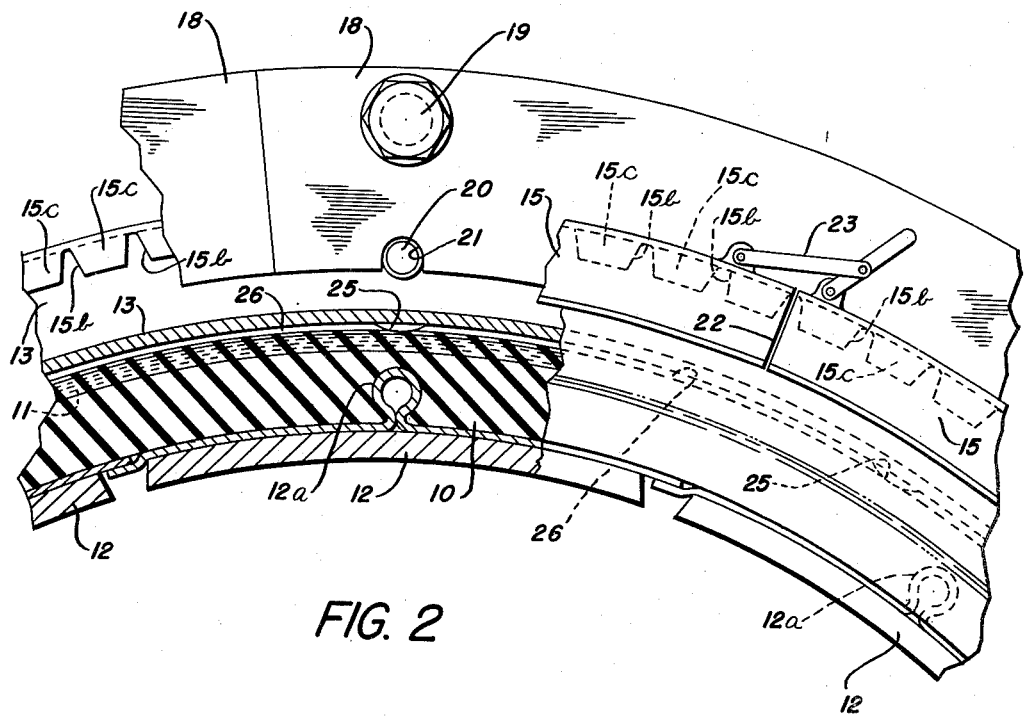
Fig. 2 is a fragmentary section of the same on line 2—2 of Fig. 1.

In the other one of the clamped-margin assemblies the clamping ring 15, either with or without its axially inner margin serrated and subsequently bent as above described, can be transversely split as at 22, Fig. 2, and there provided with a toggle-clamp 23 of a type that is commonly used for tightening of a clamping band upon a hose or the like. This permits the ring to be mounted even though it is previously given the inwardly open channel form in which it is shown.

The bag assembly is shown as being provided with a pressure-fluid supply conduit 24 leading from a suitable control valve and rotary-seal (not shown), and through a quick-release valve 24ᵃ, of which there are several well known types, for quick venting of the bag directly to the atmosphere upon lowering of the pressure in the supply conduit 24.

As the inner face of the bag, throughout nearly all of its extent, fits snugly against the metal base member 13 as above stated, for small volumetric capacity of the bag, to provide quick distension and retraction of the bag, it is desirable that a fluid-distributing and collecting system of grooves, comprising transverse grooves 25, 25 and longitudinal grooves 26, 26, be provided, as by molding, in the inner face of the bag.

The base-and-bag assembly, comprising the U-shaped base member 13 and the channel rings 15, 15 has such strength and rigidity that the said assembly can be mounted, with facility of mounting and demounting, by clamping one of the composite marginal flanges of the assembly to the fly-wheel 16 as the only support of the base-and-bag assembly. This is a distinct advantage in the matter of assembly and disassembly, as in the case of repair or replacement of parts.

Modifications are possible without sacrifice of all of the advantages set out in the above statement of objects and without departure from the scope of the invention as defined in the appended claims.

I claim:

1. A fluid-distensible actuating assembly for a clutch or a brake, said assembly comprising an annular base member of U-shape in cross-section, a fluid-distensible annular bag of U-shape in cross-section fitting about and substantially against the exterior face of the U-shaped base, and means other than the base for clamping each annular margin of the bag to the adjacent annular margin of the base, in combination with a torque-sustaining support and means clamping one margin of the defined assembly to the said support as the primary torque-sustaining connection between the said assembly and the said support.

2. A fluid-distensible actuating assembly for a clutch or a brake, said assembly comprising an annular base member of U-shape in cross-section, a fluid-distensible annular bag of U-shape in cross-section extending about the exterior face of the U-shaped base, and means clamping one annular margin of the bag to the adjacent annular margin of the base, the assembly including a torque-sustaining support and means clamping the other margin of the base and the bag to the said support as their primary torque-sustaining connection to said support.

3. An assembly as defined in claim 2 in which the two recited clamping means comprise identical respective clamping rings of channel cross-section, each embracing a margin of the bag and a margin of the base, and in which the second-mentioned clamping means comprises means clamping one of the said rings to the said support.

4. An assembly as defined in claim 2 and including interlock means preventing relative rotation of the said base and the said support.

THOMAS L. FAWICK.

References Cited in the file of this patent

UNITED STATES PATENTS

| Number | Name | Date |
|---|---|---|
| 1,924,888 | Tatter | Aug. 29, 1933 |
| 2,251,444 | Fawick | Aug. 5, 1941 |
| 2,394,494 | Fawick | May 23, 1944 |
| 2,574,574 | Ives | Nov. 13, 1951 |